US012267306B2

United States Patent
Duong et al.

(10) Patent No.: US 12,267,306 B2
(45) Date of Patent: *Apr. 1, 2025

(54) DEVICE INDEPENDENT SECURE MESSAGING

(71) Applicant: Snap Inc., Santa Monica, CA (US)

(72) Inventors: Michael Duong, Los Angeles, CA (US); Anirudh Garg, Marina Del Rey, CA (US); Subhash Sankuratripati, Playa Vista, CA (US); Edward Chenhui Xue, Arcadia, CA (US); Marcel M. Yung, New York, NY (US)

(73) Assignee: Snap Inc., Santa Monica, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/830,217

(22) Filed: Jun. 1, 2022

(65) Prior Publication Data
US 2022/0303250 A1    Sep. 22, 2022

Related U.S. Application Data

(63) Continuation of application No. 15/818,685, filed on Nov. 20, 2017, now Pat. No. 11,411,932.

(51) Int. Cl.
*H04L 51/04* (2022.01)
*H04L 9/08* (2006.01)
(Continued)

(52) U.S. Cl.
CPC ........ *H04L 63/0428* (2013.01); *H04L 9/0822* (2013.01); *H04L 9/0825* (2013.01);
(Continued)

(58) Field of Classification Search
CPC . H04L 63/0428; H04L 9/0822; H04L 9/0825; H04L 9/0844; H04L 9/14;
(Continued)

(56) References Cited

U.S. PATENT DOCUMENTS 9,065,842 B2 * 6/2015 Vandervort ........... H04L 9/3247
9,967,289 B2    5/2018 White et al.
(Continued)

OTHER PUBLICATIONS

"1.4 Asymmetric or public key cryptography", obtained online from <https://www.open.edu/openlearn/mod/oucontent/view.php?id=48322&section=1.4>, retrieved on Feb. 10, 2024 (Year: 2016).*
(Continued)

*Primary Examiner* — Zhimei Zhu
(74) *Attorney, Agent, or Firm* — Schwegman Lundberg & Woessner, P.A.

(57) ABSTRACT

Systems, devices, media, and methods are presented for device independent secure messaging. The systems and methods generate an encrypted message by encrypting message content, designated for a specified recipient, with an encryption key. The systems and methods select a set of recipient keys, associated with the specified recipient, from a plurality of member keys. For each recipient key, the systems and methods encrypt the encryption key to generate a set of encrypted keys and transmit the encrypted message and an encrypted key of the set of encrypted keys to one or more client devices associated with the specified recipient. The systems and methods then receive an acknowledgement indicating a termination status of the encrypted message.

20 Claims, 10 Drawing Sheets

(51) Int. Cl.
    *H04L 9/14*        (2006.01)
    *H04L 9/30*        (2006.01)
    *H04L 9/40*        (2022.01)

(52) U.S. Cl.
    CPC .............. *H04L 9/0844* (2013.01); *H04L 9/14* (2013.01); *H04L 9/30* (2013.01); *H04L 51/04* (2013.01); *H04L 63/061* (2013.01); *H04L 63/062* (2013.01); *H04L 2209/80* (2013.01); *H04L 2463/062* (2013.01)

(58) Field of Classification Search
    CPC ....... H04L 9/30; H04L 63/061; H04L 63/062; H04L 2209/80; H04L 2463/062; H04L 63/0823; H04L 63/083; H04L 63/0861
    See application file for complete search history.

(56) References Cited

U.S. PATENT DOCUMENTS

| | | | |
|---|---|---|---|
| 2003/0021416 A1* | 1/2003 | Brown ................... | H04L 63/04 380/277 |
| 2003/0204741 A1* | 10/2003 | Schoen ................. | H04L 63/062 726/12 |
| 2007/0156910 A1* | 7/2007 | Christie ............... | G06Q 10/107 709/227 |
| 2008/0130895 A1 | 6/2008 | Jueneman et al. | |
| 2008/0256190 A1* | 10/2008 | Ryan ....................... | H04L 51/04 709/206 |
| 2009/0307496 A1 | 12/2009 | Hahn et al. | |
| 2010/0241847 A1* | 9/2010 | van der Horst ......... | H04L 9/083 713/171 |
| 2012/0204032 A1 | 8/2012 | Wilkins et al. | |
| 2013/0166914 A1* | 6/2013 | Vandervort ........... | H04L 63/123 713/176 |
| 2015/0222432 A1 | 8/2015 | Fukuda et al. | |
| 2016/0080502 A1 | 3/2016 | Yadav et al. | |
| 2016/0105283 A1 | 4/2016 | Mityagin | |
| 2016/0226808 A1 | 8/2016 | Lin | |
| 2016/0269364 A1* | 9/2016 | White ..................... | H04L 63/20 |
| 2017/0053248 A1* | 2/2017 | Wakefield ............... | H04L 51/18 |
| 2017/0331802 A1* | 11/2017 | Keshava ................ | H04L 9/0894 |
| 2019/0020632 A1* | 1/2019 | Leavy ...................... | H04L 9/14 |
| 2019/0140832 A1 | 5/2019 | Leavy et al. | |
| 2019/0158468 A1 | 5/2019 | Duong et al. | |

OTHER PUBLICATIONS

"U.S. Appl. No. 15/818,685, Final Office Action mailed Apr. 24, 2020", 38 pgs.

"U.S. Appl. No. 15/818,685, Final Office Action mailed Aug. 25, 2021", 48 pgs.

"U.S. Appl. No. 15/818,685, Non Final Office Action mailed Feb. 5, 2021", 49 pgs.

"U.S. Appl. No. 15/818,685, Non Final Office Action mailed Aug. 23, 2019", 32 pgs.

"U.S. Appl. No. 15/818,685, Non Final Office Action mailed Dec. 20, 2021", 29 pgs.

"U.S. Appl. No. 15/818,685, Notice of Allowance mailed Apr. 13, 2022", 22 pgs.

"U.S. Appl. No. 15/818,685, Response filed Feb. 24, 2020 to Non Final Office Action mailed Aug. 23, 2019", 12 pgs.

"U.S. Appl. No. 15/818,685, Response filed Mar. 3, 2022 to Non Final Office Action mailed Dec. 20, 2021", 14 pgs.

"U.S. Appl. No. 15/818,685, Response filed Aug. 5, 2021 to Non Final Office Action mailed Feb. 5, 2021", 13 pgs.

"U.S. Appl. No. 15/818,685, Response filed Sep. 24, 2020 to Final Office Action mailed Apr. 24, 2020", 13 pgs.

"U.S. Appl. No. 15/818,685, Response filed Nov. 19, 2021 to Final Office Action mailed Aug. 25, 2021", 15 pgs.

Barker, Elaine, et al., "Recommendation for Pair-Wise Key Establishment Schemes Using Discrete Logarithm Cryptography", NIST Special Publication 800-56A, Revision 2, (May 2013), 138 pgs.

\* cited by examiner

US 12,267,306 B2

DEVICE INDEPENDENT SECURE MESSAGING

PRIORITY CLAIM

This application is a continuation of U.S. patent application Ser. No. 15/818,685, filed on Nov. 20, 2017, which is hereby incorporated by reference in its entirety.

TECHNICAL FIELD

Embodiments of the present disclosure relate generally to performing device independent secure messaging. More particularly, but not by way of limitation, the present disclosure addresses systems and methods for providing end-to-end encrypted messaging which is independent of devices used to send or receive the encrypted messages.

BACKGROUND

Telecommunications applications and devices can provide communication between multiple users which employ encryption. For example, some messaging systems secure communication sessions taking place between two users via a server. Such systems often limit users to specified computing devices. During an active session with fixed devices, the devices may send messages, check certificates, and establish keys hidden from a server routing the messages. As such, common secured or encrypted telecommunications systems or applications use device-to-device session support for encryption, tethering the session to predefined devices.

BRIEF DESCRIPTION OF THE DRAWINGS

Various ones of the appended drawings merely illustrate example embodiments of the present disclosure and should not be considered as limiting its scope.

Figure 1:
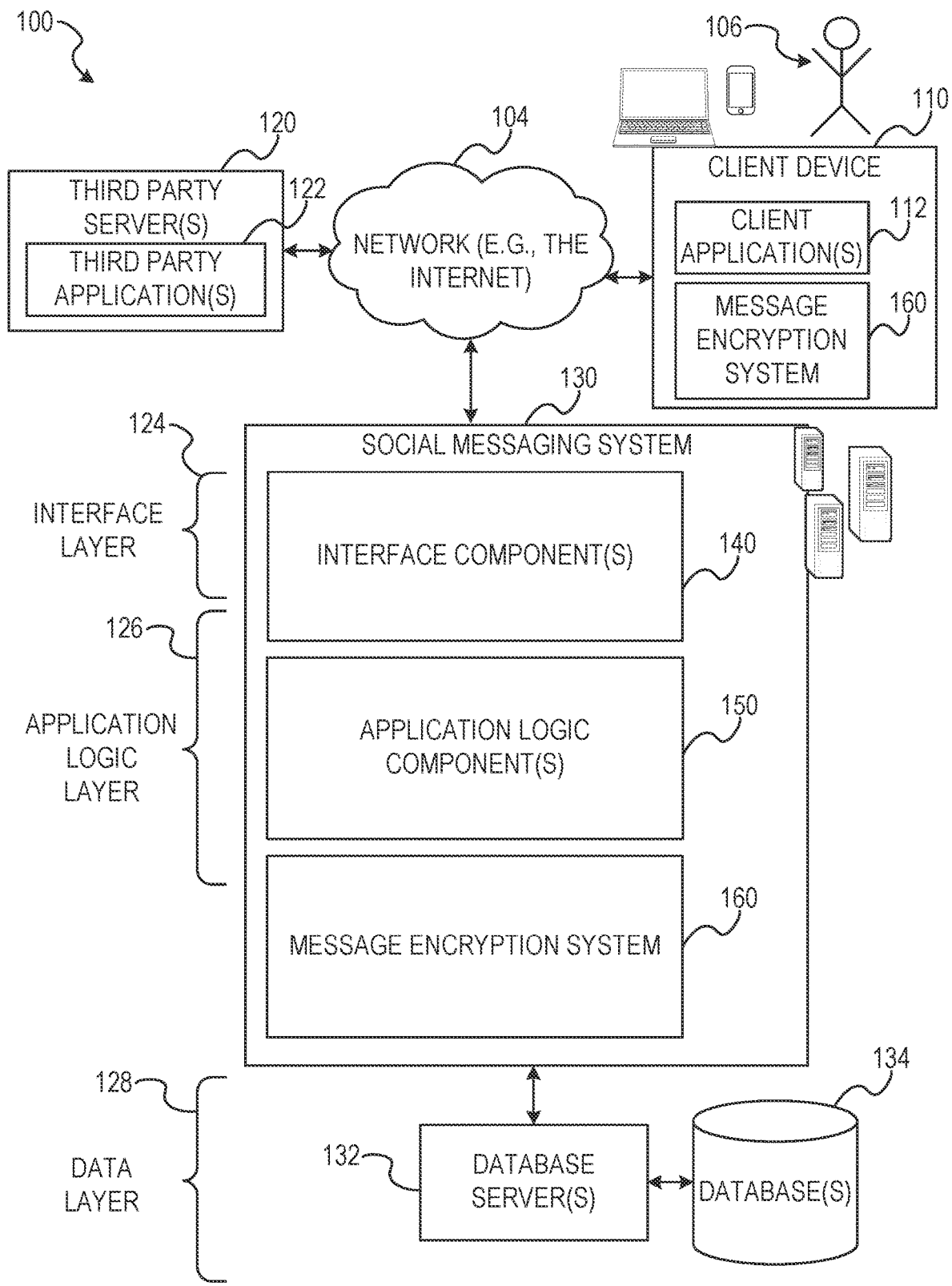
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Users of communication applications may wish to send secure and encrypted messages to one another. As described in more detail below, a user may log into a messaging account on a smartphone. The user may create messages including text, images, audio, and video in a messaging application running on the smartphone. The user may then send the message to one or more other users (e.g., recipients). The application and the smartphone may automatically encrypt the message, identify appropriate devices associated with the intended recipients, and send the encrypted message to those recipients. The encrypted messages may be delivered to an appropriate device of the intended recipient based on the recipient's user account or account activity. Further, the encrypted messages prevent unauthorized access by another user logging onto the smartphone of an intended recipient.

Previous systems and methods for secure or encrypted communication and messaging were often limited to session-based device-to-device interactions or interactions between a device and a fixed set of predetermined devices. When a user makes a move between or among devices, the previous systems and methods would be forced to re-establish a session, along with key exchanges and other cryptographic protocols. Embodiments of the present disclosure do not bind a user to a specified device. As such users may be hosted by different devices performing cryptographic functions and generating secret keys locally without sharing. Previous systems and methods encountered difficulties or failures where a sender transmitted a message to a device of an intended receiver, where the intended receiver had switched devices. Such changes precluded the previous systems and methods from decrypting the message or enable unintended recipients access to messages based on access to the previously used device. Further, the device-to-device and session-based nature of previous systems and methods precluded sender redundant parallel transmission to shorten delivery time, dynamic establishment of cryptographic states at new devices without access to a prior state, encrypted state storage and recovery transferrable among devices accessible by a user, among other aspects enabled by the present disclosure. With respect to time, previous systems at times added delays which disturb human user experiences of the message exchange, which is prevented by the dynamic account-to-account or end-to-end nature of the present disclosure.

Rather than moving messages and content from device to device, the user may access messages and content based on the account log in, independent of the smartphone or other device being used and access messages which may have been sent during switching between user devices. Aspects of the present disclosure are directed to providing device independent secure messaging. Embodiments of the systems and machines described herein involve cryptographic technology to achieve end-to-end or account-to-account security for messages sent from a sender account to one or more recipient accounts. The encrypted messages may be transmitted via one or more servers without the servers having access to the content of the encrypted messages, while providing routing information among the accounts of the sender and recipients. The systems and methods described herein provide fast and reliable encrypted message transmission to perform secure end-to-end messaging. The cryptographic techniques described herein, together with caching of device information, per account, at a server and caching a device state at information at devices and at servers, enable users to share or exchange devices without access to cryptographic keys of the other user.

The above is one specific example. The various embodiments of the present disclosure relate to devices and instructions by one or more processors of a device to performing device independent secure messaging. A message encryption system is described that enables end-to-end encrypted messaging between users of a communication system independent of computing devices being accessed by the users.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although illustrated herein as client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of instructions, as a special purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface component(s) (e.g., a web server) 140, which receives requests from various client-computing devices and servers, such as client device 110 executing client application(s) 112, and third-party server(s) 120 executing third party application(s) 122. In response to received requests, the interface component(s) 140 communicates appropriate responses to requesting devices via a network 104. For example, the interface component(s) 140 can receive requests such as Hypertext Transfer Protocol (HTTP) requests, or other web-based, Application Programming Interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of a message encryption system 160 such that components of the message encryption system 160 configure the client device 110 to perform a specific set of functions with respect to operations of the message encryption system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the message encryption system 160 to perform device independent secure messaging.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. User 106 can be a person, a machine, or other means of interacting with the client device 110. In some embodiments, the user 106 interacts with the social messaging system 130 via the client device 110. The user 106 may not be part of the networked system 100, but may be associated with the client devices 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the message encryption system 160 capable of performing device independent secure messaging. The message encryption system 160 may also include computing software and hardware elements for cryptographic functions such as encryption functions and cryptographic key management operations. Similarly, the client device 110 includes at least a portion of the message encryption system 160, as described above. In other examples, client device 110 may include the entirety of the message encryption system 160. In instances where the client device 110 includes a portion of (or all of) the message encryption system 160, the client device 110 can work alone or in cooperation with the social messaging system 130 to provide the functionality of the message encryption system 160 described herein.

In some embodiments, the social messaging system 130 may be an ephemeral message system that enables ephemeral communications where content (e.g., video clips or images) are deleted following a deletion trigger event such as a viewing time or viewing completion. In such embodiments, a device uses the various components described herein within the context of any of generating, sending, receiving, or displaying aspects of an ephemeral message. For example, a device implementing the message encryption system 160 may perform device independent secure messaging. The device may encrypt an ephemeral message as a part of a generation of content for the ephemeral message. The device may then encrypt an encryption key associated with the encrypted ephemeral message, securely transmit the encrypted ephemeral message to one or more client devices associated with a specified recipient for the ephemeral message, and acknowledge receipt and decryption of the encrypted ephemeral message by a client device being accessed by the specified recipient.

Figure 2:
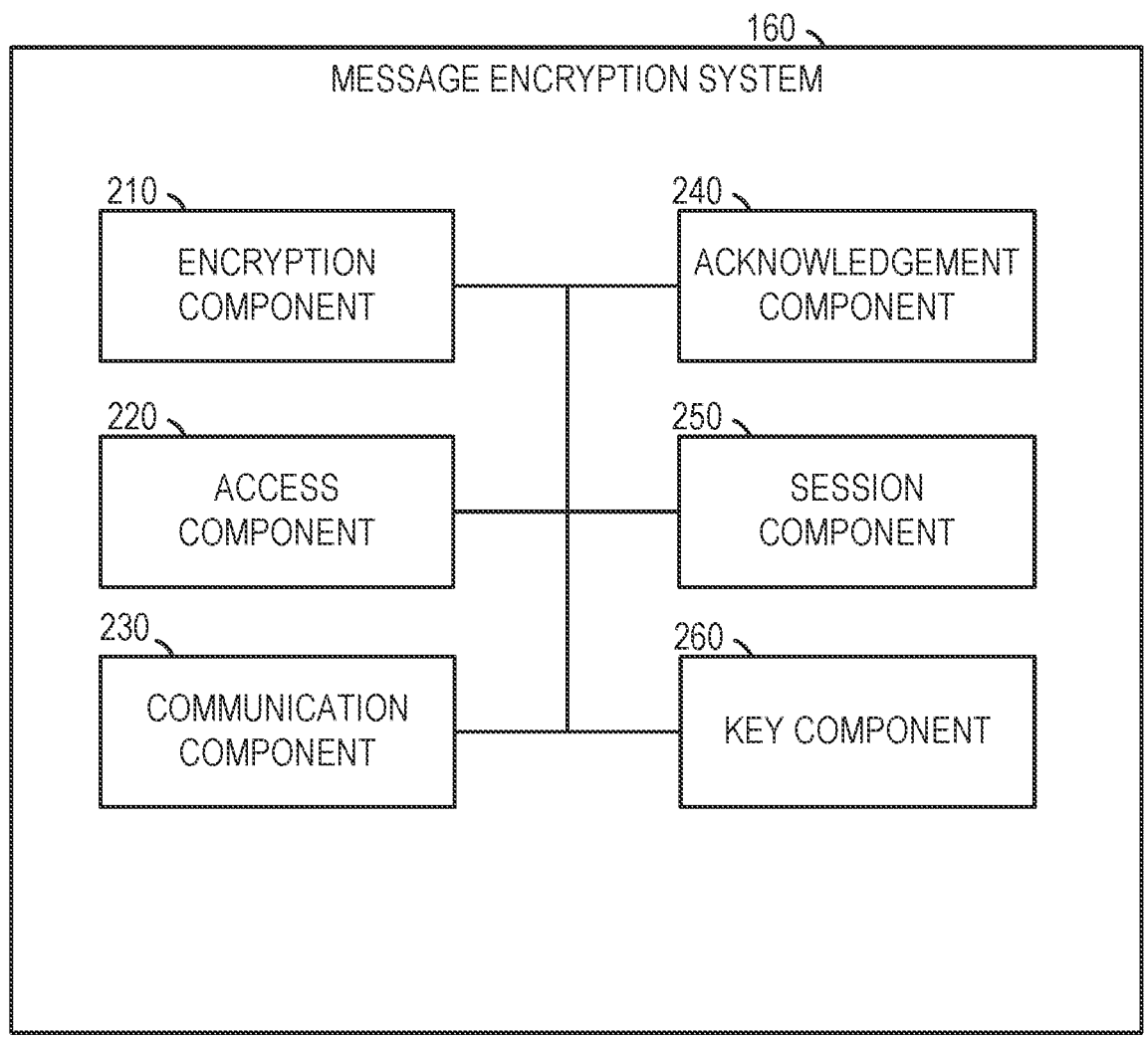
FIG. 2 is a diagram illustrating a message encryption system, according to some example embodiments.

In FIG. 2, in various embodiments, the message encryption system 160 can be implemented as a standalone system or implemented in conjunction with the client device 110, and is not necessarily included in the social messaging system 130. The message encryption system 160 is shown to include an encryption component 210, an access component 220, a communication component 230, an acknowledgement component 240, a session component 250, and a key component 260. All, or some, of the components 210-260, communicate with each other, for example, via a network coupling, shared memory, and the like. Each component of components 210-260 can be implemented as a single component, combined into other components, or further subdivided into multiple components. Other components not pertinent to example embodiments can also be included, but are not shown.

Figure 3:
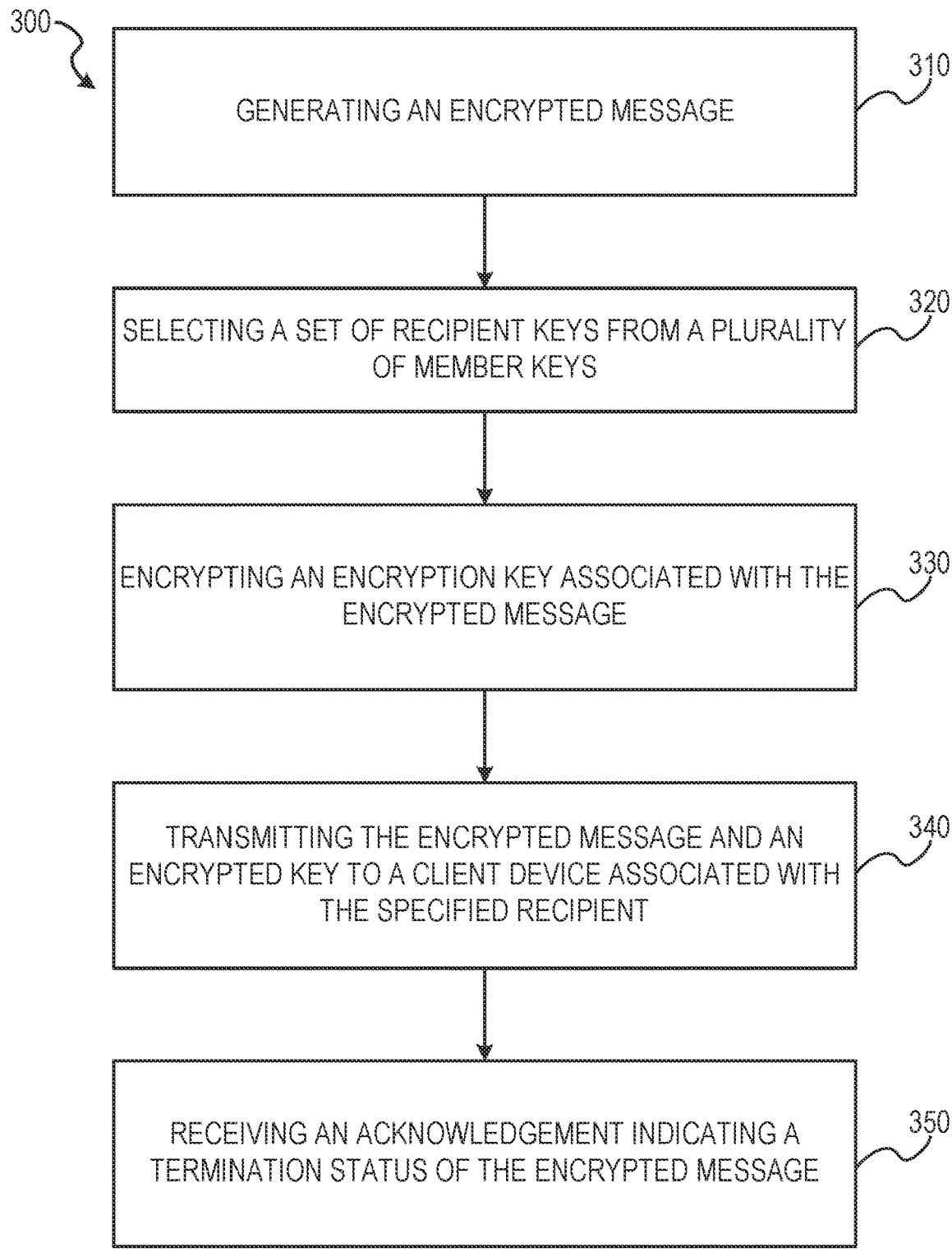
FIG. 3 is a flow diagram illustrating an example method for performing device independent secure messaging, according to some example embodiments.

FIG. 3 depicts a flow diagram illustrating an example method 300 for performing device independent secure messaging. The operations of method 300 may be performed by components of the message encryption system 160, and are so described below for purposes of illustration.

In operation 310, the encryption component 210 generates an encrypted message. In some embodiments, the encryption component 210 generates the encrypted message by encrypting message content with an encryption key. The encryption key may be a private key. In some instances, the encryption component 210 uses symmetric encryption or authenticated encryption to encrypt the message contents. The cipher text of the message may be represented as $C(m)=E(k, m)$ where $C(m)$ represents the cipher text, k represents the key, m represents the message content, and E represents the encryption function.

Message content may include text, images, audio data, video data, animations, or any other suitable information to be transmitted to a recipient. In some instances, the message content includes or is associated with a message framework. The message framework may include formatting data, metadata, recipient data, and any other suitable information for transforming the message content into a message for transmission within the social messaging system 130 or the message encryption system 160. The encrypted message may be designated for a specified recipient (e.g., a recipient identified in the recipient data or the message content). In some embodiments, the encryption key is a key pair including a private key and a public key. The encryption component 210 may generate the encrypted message using the private key. The private key may be retained at the client device 110 of the member generating and sending the message while the public key may be transmitted with the message to the specified recipient.

In some embodiments, prior to generating the encrypted message, the key component 260 may generate the encryption key. In some instances, the key component 260 generates the encryption key in response to a sender logging into a client device 110 to generate and send message content. The sender may log into an application, such as a social messaging application stored on the client device 110 of the sender. The sender may log into the application using a user name and password or other means or attributes (e.g., facial recognition or finger prints) to establish the identity of the sender with the application and/or the client device 110. Verification of the identity of the sender may verify ownership of a member account of the sender with the application and one or more servers or databases associated with the application. Where the log in is a first log in into a current device, or a first log in after a list of keys for the sender has been removed, the log in is considered a new log in, and encryption keys may be generated as described below. Where the log in is a subsequent log in, existing valid encryption keys may be retrieved from the key database.

Upon detecting a new login and verification of an identity of the sender, the key component 260 may generate an encryption key. Upon generating the encryption key, the key component 260 alone or in cooperation with the communication component 230 may transmit the encryption key or a related key to a key database associated with the application. In some embodiments, the key component 260 generates a public key and a private key, and presents the public key to the key database. The public key may be a public key for a pairwise long lived ElGamal key, or any other suitable public key. In some instances, the key component 260 selects an exponent value r(i, j). The key component 260 computes y(i,j)=g^[r(i, j)]. The public key may be represented in the equation as y(i, j) and "g" may be a generator to the power of the chosen exponent value. In some instances, the "^" operation represents exponentiation in a correct mathematical group. The public key may then be certified, such as by a certification authority or a repository. The public key and its certificate, in suitable embodiments, may be presented to the key database. The key database may then register the public key to the sender, the servers, and the client device 110 at which the sender is logged into the application and the sender's account.

In some embodiments, where the public key is certified, prior to encrypting and transmitting message content, the user or the message encryption system 160 may be guided through a certification process or an attestation that the key is valid within a domain of the key database, the social messaging system 130, or the message encryption system 160. In some instances, the certification process involves a certification authority. The certification authority may sign or otherwise validate the key (e.g., a public key) of the sender to be registered with the key database. The validation of the certification authority may indicate a valid path within a tree of keys that are certified. In some instances, the key database checks or verifies validity of keys employed in encryption of message content. The specified recipient of the encrypted message may also use the certification to validate that the key or keys used to encrypt the message content belong to or are associated with the sender of the encrypted message.

In operation 320, the access component 220 selects a set of recipient keys from a plurality of member keys. In some embodiments, the key database maintains a list of keys for each member or user of the social messaging system 130 or the message encryption system 160. The specified recipient may be associated with the set of recipient keys. Each key of the set of recipient keys may be associated with a distinct computing device or client device (e.g., client device 110) with which the recipient logged in or verified a member account of the social messaging system 130 or message encryption system 160. The access component 220 may select recipient keys by accessing the key database via the network 104. In some instances, the access component 220 passes the set of recipient keys to one or more components of the message encryption system 160, as described below in more detail.

For example, the key database may include a list K(i) of keys for each member i. Each key included in the list of keys may be associated with the member and a computing device t and be represented as L(i, t). The key database may also include certificates for each key, as discussed above. In some embodiments, the list of keys for each member is limited to a predetermined number of keys. For example, the list of keys may be limited to three to ten keys, with each key associated with a distinct device. The keys in the list of keys may be limited to a most recent set of client devices used by a member, such as the last five devices on which the member logged into the application or social messaging system 130. In some instances, the list of keys is limited to keys for unique or distinct client devices. For example, where the list of keys is limited to a maximum of five keys, a member may have a key list of only three keys if the member has only logged into the application or social messaging system 130 with three client devices (e.g., smartphones).

In some embodiments, the key database includes timing information with the list of keys. The timing information may indicate changes between devices used by the member to log into the social messaging system 130. The key database may also include location information with the list of keys. The location information may indicate common locations of accessing the social messaging system 130. In such instances, the key database may use one or more of the timing information and the location information to estimate a probable device at which a member may be reached, in order to direct the encrypted message of operation 310.

In some embodiments, the set of recipient keys are public keys for a specified member. The plurality of member keys may similarly be public keys associated with members, and client devices associated with each member, of the social messaging system 130. Each public key may be associated with a member (e.g., a recipient) of the social messaging system 130 and a specified client device. The client device with which a public key is associated is a client device used by a member to access the social messaging system 130. As such, in some embodiments, the public keys may be stored as triples on a key database. The triple may comprise a member identifier, a client device identifier, and the public key. Each public key associated with a single member, but differing client devices, may be distinct from one another.

In operation 330, the encryption component 210 encrypts the encryption key. In some embodiments, the encryption component 210 encrypts the encryption key for each recipient key of the set of recipient keys. Where the encryption key is encrypted for each recipient key of the set of recipient keys, the encryption component 210 generates a set of encrypted keys. In some embodiments, the encryption key is encrypted using each recipient key (e.g., a public encryption key, a symmetric key, or a derivation of a recipient key) of the set of recipient keys. For example, if the access component 220 selects five recipient keys to comprise the set of recipient keys, the encryption component 210 encrypts the encryption key five times, one for each distinct recipient key of the set of recipient keys. In embodiments, where the message is encrypted using a private key, the encryption component 210 may encrypt the public key of the key pair with each recipient key or derivate thereof. The encryption component 210 may thereby generate a set of encrypted public keys.

In some instances, the encryption component 210 generates a common key to generate a set of common keys. The common key may be a Diffie-Hellman common key computed between a recipient key and a public key of the sender or the client device associated with the sender. In some embodiments, the encryption component 210 computes the common key by raising the recipient key (e.g., y(i, t)) to a private exponent value of the sender in a specified mathematical group. The encryption component 210 may generate a common key for each recipient key of the set of recipient keys. As such, the set of recipient keys may have the same number of keys as the set of common keys.

After generating the set of common keys, the encryption component 210 generates a symmetric key for each common key of the set of common keys. The symmetric key may be generated by applying a key derivation function to a common key of the set of common keys. In some embodiments, the encryption component 210 generates a set of symmetric keys for the specified recipient of the message. The set of symmetric keys may have a same number of keys as the set of common keys and the set of recipient keys. In response to generating the set of symmetric keys, the encryption component may encrypt the encryption key. In some embodiments, the encryption component 210 encrypts the encryption key for each symmetric key. For example, where the set of symmetric keys includes ten symmetric keys, the encryption component 210 may encrypt the encryption key ten different times, using each symmetric key.

In some embodiments, in applying key derivation functions, the encryption component 210 may incorporate a one-time nonce. The one-time nonce may be exchanged by the sender and specified recipient prior to operation 340, described in detail below. The one-time nonce may be exchanged on a per message basis, at specified time intervals, on demand, or otherwise. Where the one-time nonce is shared at specified time intervals, the one-time nonce may be applicable or valid during a time period (e.g., an hour, a day, a week). When the time period is expired, a new one-time nonce may be shared and a previous one-time nonce will no longer be used for encryption and decryption between the sender and the recipient. The encryption component 210 adds or otherwise applies the one-time nonce to the key derivation function to derive the symmetric keys. If a member, who did not exchange the one-time nonce, receives an encrypted message and encrypted key described by the present disclosure, that member would be precluded from deriving or decrypting the encryption key and thereby preclude decryption of the encrypted message.

In some embodiments, the Diffie-Hellman key exchanges are performed relative to a window of time (e.g., a specified time interval or a specified time period). In such instances, the key component 260 may generate a temporary window key. The temporary window key is valid for a time interval (e.g., a window of time). The time interval may be any suitable length of time, such as an hour, a day, a week, or other time periods. The time interval may also relate to sessions or messages, such as a temporary window key "rt" generated on a per message basis. The encryption component 210 uses the temporary window key "rt" as a private key and a public key of $yt=g\hat{}\{rt\}$ for the Diffie-Hellman key exchange. The public key may be a generator "g" raised to the private key. The key that is used to encrypt the encryption key may be derived from the temporary window key and the public key. The recipient has a signature key to sign a new window public key "yt." The new window public key may be signed by a signature Sig(yt) attesting that the recipient generated the new window public key. The recipient may verify the signed window public key with a sender verification key. In some instances, the sender verification key is certified. The recipient may then use the window public key "yt" to compute a joint Diffie-Hellman key for the sender and recipient.

In some embodiments, instead of using a signature key and performing signatures and verifications, a long-term key "y(i, j)" is used to generate a joint key. The long-term key may be a key within the list of keys for the sender linking the sender and the client device sending the encrypted message to a key in the key database. The long-term key may be used to generate the joint key with the recipient, and the joint key may be used to present a message authentication code (MAC) of the new window public key "yt." The joint encryption key, based on the Diffie-Hellman computation, is valid within the time interval. After the time interval expires, the temporary window key "rt" may be erased, precluding key reconstruction, as the only key remaining after the time interval is the long-term key of the sender. Here the long-term key may act as a permanent key outside of the time window. In some embodiments, the server (e.g., the key database) has a permanent key as well, a server key. The server key may be used to derive a MAC key. The computation to derive the MAC key may be done with respect to the joint key agreed with the server and the members. The server may check integrity and vouch for the new user keys and distribute them to the members. In some instances, user-to-server common Diffie-Hellman key can be used to generate MACs of various sensitivity levels on messages.

In operation 340, the communication component 230 transmits the encrypted message and an encrypted key of the set of encrypted keys to one or more client devices associated with the specified recipient. The communication component 230 may transmit the encrypted message and the encrypted key to a server (e.g., the key database) via the network 104. The server may then transfer, transmit, or hold the encrypted message and encrypted key for the specified recipient. The communication component 230 may attempt to transmit the encrypted message and each encrypted key to a client device associated with the recipient key used to encrypt the encrypted key. In some embodiments, transmission to each client device may be done in parallel. The communication component 230 may also send the encrypted message and an encrypted key successively or serially to each client device associated with the specified recipient. The parallel or serial transmission may enable the sender to securely transmit the encrypted message and have one or more servers appropriately route and deliver the message to a client device at which the specified recipient is currently logged in.

The server may know the specified receiver is online (e.g., logged into a member account of the social messaging system 130 via an application) and transmit the information to the specified recipient while the specified recipient is online. Where the specified recipient is not online, the communication component 230 may cause the account of the specified recipient or the application to wake up and receive the information. When the specified recipient is determined to be online, the communication component 230 or the server may determine that the specified recipient is online at a client device associated with one of the recipient keys and transmit the encrypted message and the encrypted key which has been encrypted with that recipient key to the client device currently online. In some instances, where the specified recipient is offline, the server may store or hold the encrypted message and the encrypted key at the server for later delivery.

In embodiments where the set of encrypted keys are a set of encrypted public keys, the communication component 230 transmits the encrypted message and an encrypted public key of the set of encrypted public keys. As described above, each recipient key may be associated with the specified recipient and a distinct client device used by the specified recipient. The communication component 230 may transmit the encrypted message along with an encrypted key resulting from encrypting the encryption key with a recipient key associated with the distinct client device. For example, if client device A is associated with recipient key A, the encrypted key transmitted to client device A, along with the encrypted message, is the result of encrypting the encryption key with recipient key A.

In some instances, one or more client devices of the sender may be identified as recipient devices. A key associated with the sender and each of the sender's alternative client devices may be used to encrypt the encryption key. Once encrypted, the communication component 230 may switch between client devices to send and receive messages related to the encrypted message. For example, the encrypted message may be sent from client device X and received by client devices A (e.g., the recipient's client device) and client device Y (e.g., a client device of the sender). Replies, acknowledgements and other interactions may be sent from client device A to one or more of client devices X and Y, such that the receiver may receive the acknowledgements or replies regardless of the device currently being used. Where a change of device, between client device X and client device Y, triggers a retry to send a reply or an acknowledgement, the client device A may perform one or more of the operations described below with respect to FIG. 4.

In operation 350, the acknowledgement component 240 receives an acknowledgement indicating a termination status of the encrypted message. Upon transmitting the encrypted message and the encrypted key, the acknowledgement component 240 may be triggered to listen for an acknowledgment from the server or from the client device to which the encrypted message was transmitted. In some embodiments, upon receiving the encrypted message and the encrypted key, the client device of the specified receiver may decrypt the encrypted key with a private key corresponding to a public recipient key used to encrypt the key. The client device of the specified recipient may complete the Diffie-Hellman key exchange by computing the common key and the symmetric key to recover the encryption key used by the encryption component 210 to encrypt the message contents. Once the encryption key is decrypted, the client device of the specified recipient may recover the message content by decrypting the encrypted message.

In some embodiments, upon decrypting the encrypted message, the client device of the specified recipient may engage the message encryption system 160 to generate and send the acknowledgement to the client device of the sender. Where the specified recipient does not log in or otherwise does not receive and decrypt the encrypted message within a specified period of time, the server may generate the acknowledgement to indicate the encrypted message is lost or otherwise undelivered. In these instances, the server may retain the encrypted message for later delivery, attempt to deliver the encrypted message to another device associated with the specified recipient, or otherwise attempt to complete transmission of the encrypted message.

Figure 4:
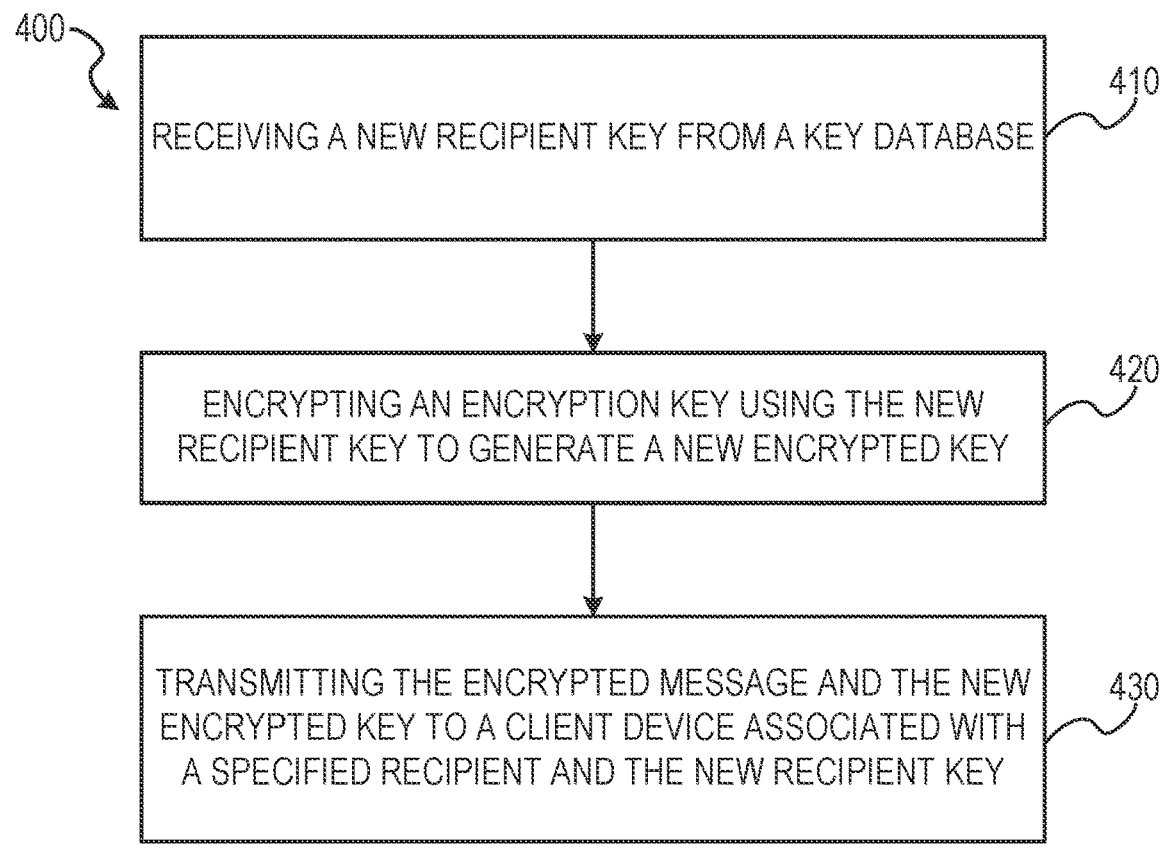
FIG. 4 is a flow diagram illustrating an example method for performing device independent secure messaging, according to some example embodiments.

FIG. 4 depicts a flow diagram illustrating an example method 400 for performing device independent secure messaging. The operations of method 400 may be performed by components of the message encryption system 160. In some instances, certain operations of the method 400 may be performed using one or more operations of the method 300 or as sub-operations of one or more operations of the method 300, as will be explained in more detail below. For example, operations of the method 400 may be performed after receiving the acknowledgement, in operation 350, from a key database, with the acknowledgement indicating a new recipient key for the specified recipient. The acknowledgement, indicating the new recipient key, may cause one or more components of the message encryption system 160 operating on the client device of the sender to retry one or more operations for retransmission of the encrypted message to the specified recipient. The retry operations may enable specified recipient to be fully dynamic, moving among devices, while still receiving encrypted message content.

In operation 410, the communication component 230 receives a new recipient key from the key database. The new recipient key is associated with the specified recipient of the encrypted message. The new recipient key may be received by the key database after the specified recipient logs into a client device which is not previously represented by or associated with a recipient key in the list of keys for the specified recipient. In some embodiments, the new recipient key may be received by the key database where a certification for one or more previous keys has expired. The key database may detect the expiration and notify client devices associated with the specified recipient. Upon the next log in at each client device, the client devices may generate a new recipient key and transmit the new recipient key to the key database.

In operation 420, the encryption component 210 encrypts the encryption key using the new recipient key to generate a new encrypted key. In some embodiments, the encryption component 210 directly encrypts the encryption key with the new recipient key. The encryption component 210 may also perform one or more key derivations or other functions to generate a value or key used to encrypt the encryption key of the sender. For example, in some embodiments, the encryption component 210 performs the Diffie-Hellman key exchange and generates a new symmetric key for use in encrypting the encryption key, as described above.

In operation 430, the communication component 230 transmits the encrypted message and the new encrypted key to a client device associated with the specified recipient and the new recipient key. Transmission of the encrypted message and the new encrypted key may be performed in a manner similar to or the same as described above with respect to operation 340. The communication component 230 may transmit the encrypted message and the new encrypted key, via one or more servers and communications network, to the client device associated with the specified recipient and the new recipient key. Once transmitted to the client device, the encrypted message is received and decrypted. The recipient's client device may then generate an acknowledgement, as described above.

In some embodiments, where no current or valid recipient keys exist, and a retry operation is performed, the retry attempt may time out after a specified period of time. For example, where the specified recipient does not log in to replenish valid recipient keys, if the encrypted message is still retained at a client device of the sender, the encrypted message may be erased. Upon erasure of the encrypted message, the message encryption system 160 may generate a graphical user interface display to indicate failure to deliver the encrypted message.

Figure 5:
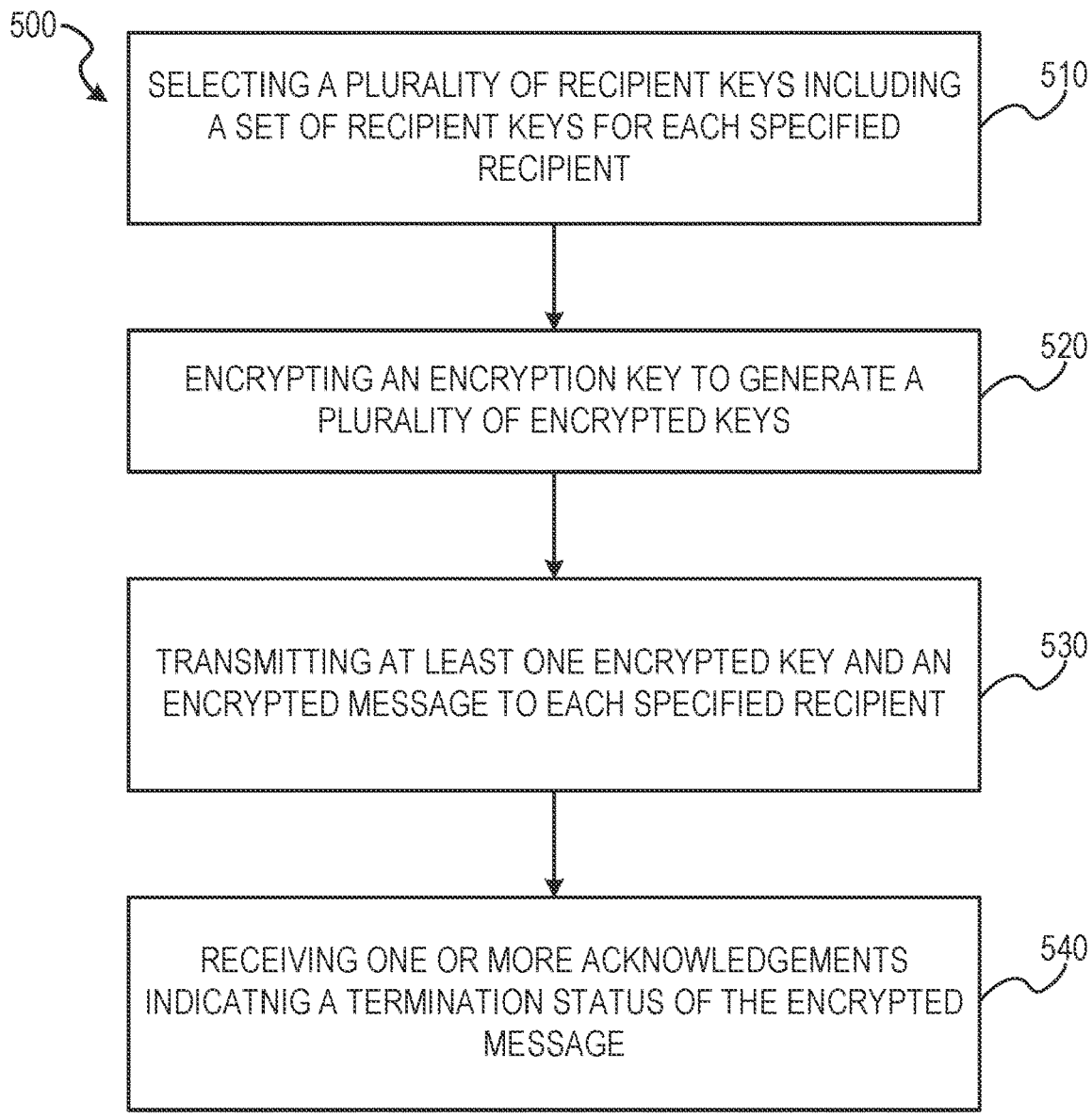
FIG. 5 is a flow diagram illustrating an example method for performing device independent secure messaging, according to some example embodiments.

FIG. 5 depicts a flow diagram illustrating an example method 500 for performing device independent secure messaging. The operations of method 500 may be performed by components of the message encryption system 160. In some instances, certain operations of the method 500 may be performed using one or more operations of the method 300 or the method 400 or as sub-operations of one or more operations of the method 300 or the method 400, as will be explained in more detail below. For example, in some embodiments, the specified recipient for which the encrypted message is to be transmitted is a plurality of specified recipients.

In operation 510, the access component 220 selects a plurality of recipient keys including a set of recipient keys for each specified recipient of the plurality of specified recipients. The access component 220 may access, select, and retrieve the plurality of recipient keys in a manner similar to or the same as described above with respect to operation 320. In some instances, the access component 220 selects a set of recipient keys, for each specified recipient, from the key database. The access component 220 may then pass the plurality of recipient keys and information relating to recipients associated with each key or each set of keys to the encryption component 210.

In some embodiments, a portion of the plurality of specified recipients are distraction recipients. The distraction recipients may be understood as duplicitous or fake recipients. The fake recipients may not be members of the social messaging system 130 or the message encryption system 160. The distraction recipients may be used to hide a specified recipient and introduce uncertainty about the specified receiver at one or more servers involved in at least a portion of the transmission of the encrypted message between the sender and the specified recipient. In some embodiments, recipient keys for the distraction recipients may have a value of zero instead of an encryption key. Client devices (e.g., the client device 110) receiving an encrypted message resulting from the zero value may register or otherwise understand they are acting as distraction recipients.

Although described with respect to individual sets of recipient keys, in some embodiments, a plurality of specified recipients may share a recipient key or set of recipient keys. For example, the plurality of specified recipients may have shared a pre-established recipient key or set of recipient keys. Designation of the plurality of specified recipients within the message content may cause the access component 220 to select the pre-established recipient key or set of recipient keys associated with the plurality of specified recipients on the key database.

In operation 520, the encryption component 210 encrypts the encryption key to generate a plurality of encrypted keys. In some embodiments, the encryption component 210 encrypts the encryption key for each recipient key of the plurality of recipient keys to generate the plurality of encrypted keys. The encryption component 210 may generate the plurality of encrypted keys in a manner similar to or the same as described above with respect to operation 330.

In operation 530, the communication component 230 transmits one or more encrypted keys and the encrypted message. In some embodiments, the communication component 230 transmits at least one encrypted key and the encrypted message to each specified recipient. Each encrypted key corresponds to a recipient key of the set of recipient keys associated with the specified recipient to which the encrypted message and encrypted key is sent. For example, the communication component 230 may transmit an encrypted key and the encrypted message to each client device associated with each specified recipient. In such instances, the encrypted key transmitted to a client device of a specified recipient was encrypted using a recipient key associated with that client device and the specified recipient associated with that client device.

In operation 540, the acknowledgement component 240 receives one or more acknowledgements indicating a termination status of the encrypted message. The acknowledgement component 240 may receive the termination status of the encrypted message for one or more specified recipient of the plurality of specified recipients. In embodiments where a plurality of recipients are identified and a pre-established recipient key or set of recipient keys are accessed, the acknowledgement component 240 may receive acknowledgement from client devices associated with the plurality of recipients and transmitted in a bundle simultaneously indicating all of the available acknowledgements from the plurality of recipients.

Figure 6:
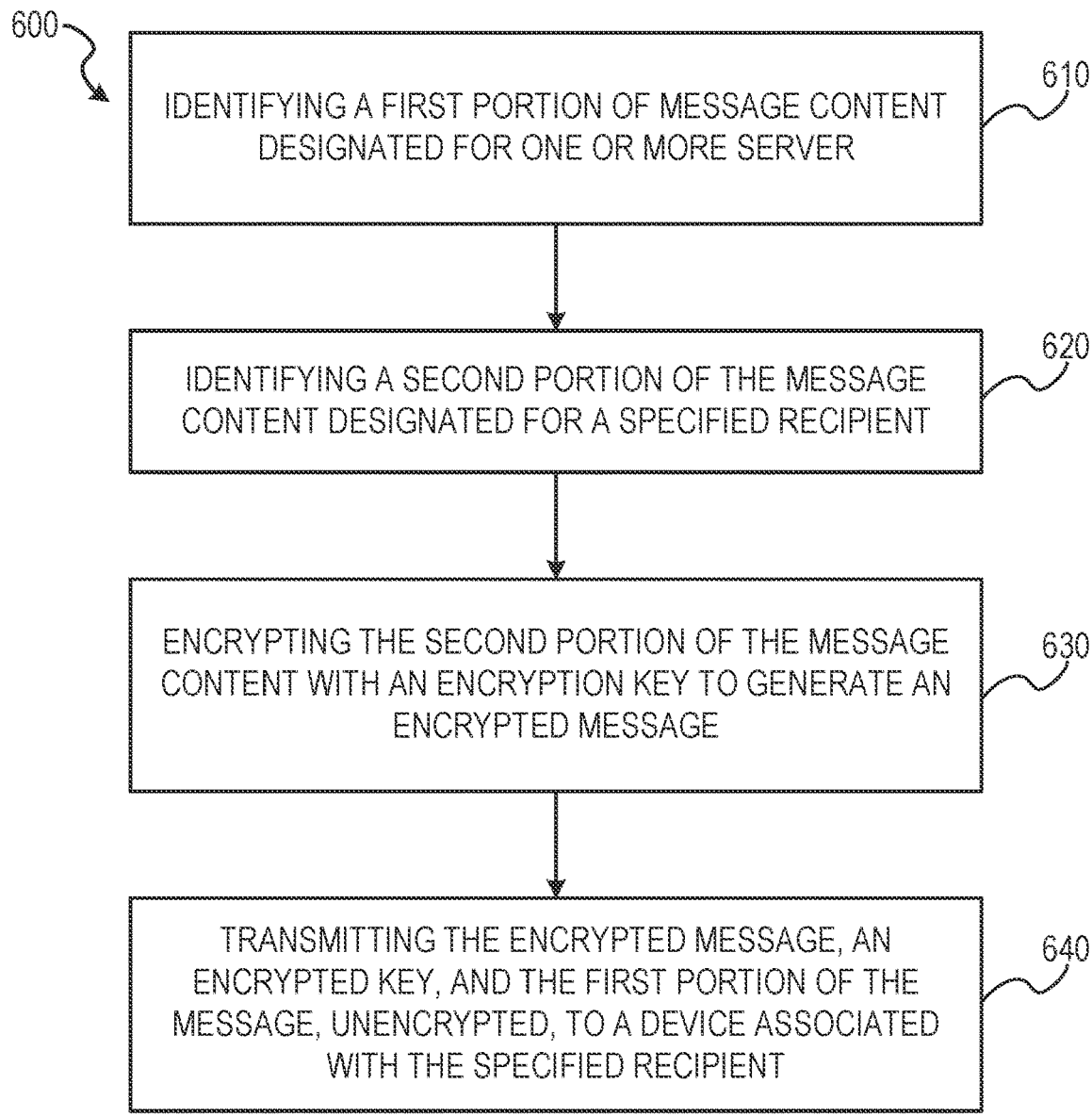
FIG. 6 is a flow diagram illustrating an example method for performing device independent secure messaging, according to some example embodiments.

FIG. 6 depicts a flow diagram illustrating an example method 600 for performing device independent secure messaging. The operations of method 600 may be performed by components of the message encryption system 160. In some instances, certain operations of the method 600 may be performed using one or more operations of the method 300, 400, or 500 or as sub-operations of one or more operations of the method 300, 400, or 500, as will be explained in more detail below.

In operation 610, the encryption component 210 identifies a first portion of the message content designated for one or more server. The first portion of the message may have characteristics, keywords, or other information to be passed to or presented to one or more servers (e.g., the key database) during transmission of the encrypted message from the sender to the specified recipient. In some embodiments, the first portion of the message content is identified as routing data, recipient data, timing information, or other data relating to transmission of a secured portion of the message content.

In operation 620, the encryption component 210 identifies a second portion of the message content designated for the specified recipient. The second portion of the message content may include the text, images, audio data, video data, or other information to be passed to the specified recipient in a secured manner. The second portion of the message content may be identified by data type, tags, identifiers, generation source (e.g., captured images or audio), or any other suitable information. The second portion of the message content, once identified, may be passed to the encryption component 210.

In operation 630, the encryption component 210 encrypts the second portion of the message content with the encryption key to generate the encrypted message. The encryption component 210 may encrypt the second portion of the message in a manner similar to or the same as described above with respect to operation 310.

In operation 640, the communication component 230 transmits the encrypted message, the encrypted key, and the first portion of the message content. In some embodiments, the first portion of the message content is transmitted in an unencrypted form. The communication component 230 may transmit the encrypted message, the encrypted key, and the unencrypted first portion of the message content to the specified recipient in a manner similar to or the same as described above with respect to one or more of operations 340, 430, or 530.

Figure 7:
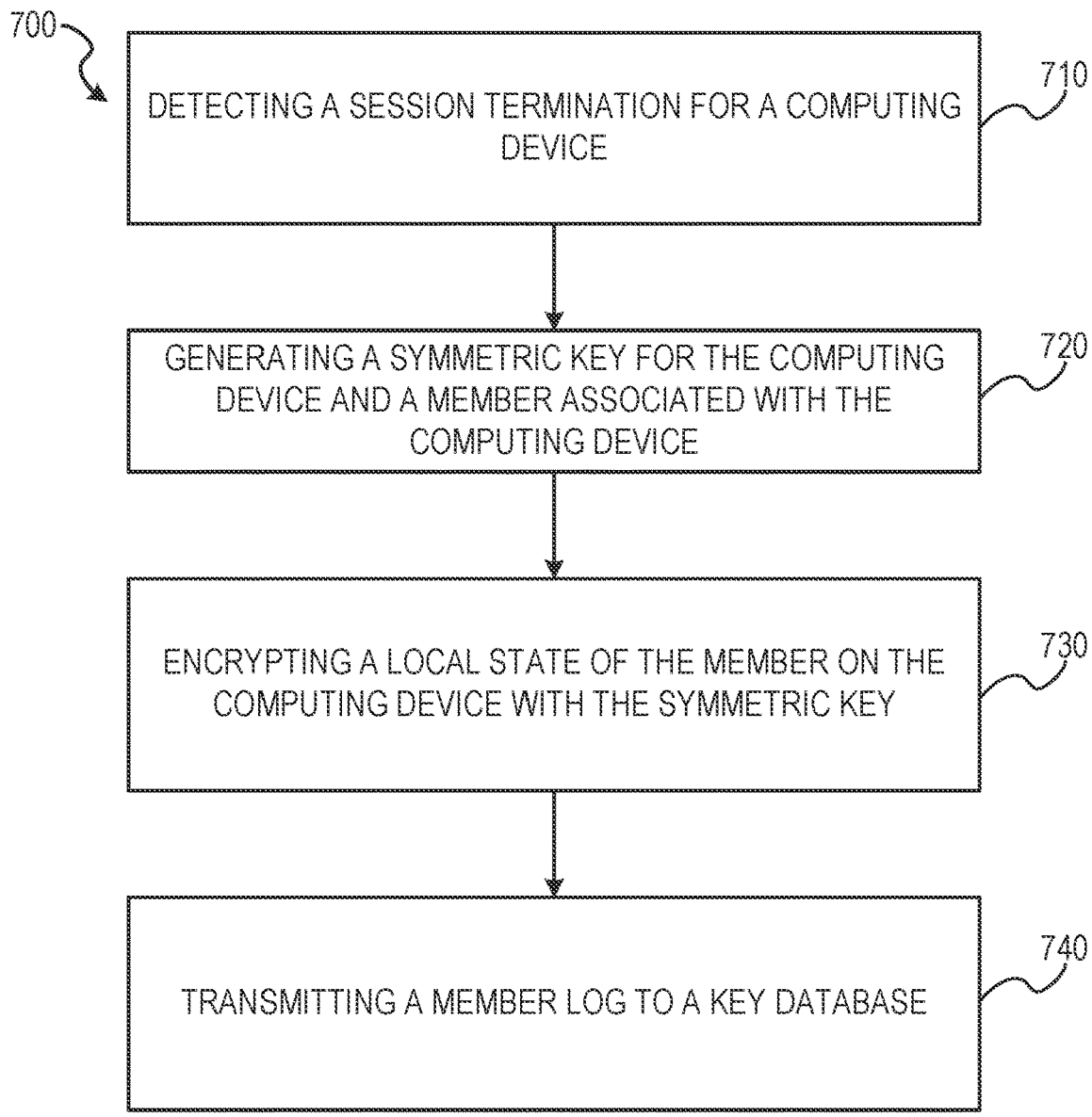
FIG. 7 is a flow diagram illustrating an example method for performing device independent secure messaging, according to some example embodiments.

FIG. 7 depicts a flow diagram illustrating an example method 700 for performing device independent secure messaging. The method 700 may be understood as a method for local state preservation. The local state may be preserved but remain hidden from users other than the sender, even when such users log in to the current device. The operations of method 700 may be performed by components of the message encryption system 160. In some instances, certain operations of the method 700 may be performed using one or more operations of the method 300, 400, 500, or 600 or as sub-operations of one or more operations of the method 300, 400, 500, or 600, as will be explained in more detail below.

In operation 710, the session component 250 detects a session termination for the computing device. The session termination may represent the sender logging out of the account, the application, the social messaging system 130, the message encryption system 160, or the client device. In some instances, the log out event may be triggered by a log in event, by the sender, at a distinct client device different from the client device into which the sender previously logged in.

In operation 720, the key component 260 generates a symmetric key for the computing device and a member associated with the computing device. In some embodiments, the operation 720 is performed in a manner similar to or the same as described above with respect to operation 310 or 330. The symmetric key may be generated from a common key using a key differentiation function. The common key may be generated using at least part of a Diffie-Hellman key exchange.

In operation 730, the encryption component 210 encrypts a local state of the member on the computing device with the symmetric key. The encryption component 210 may encrypt the local state of the member by encrypting private and public keys stored on the client device, certificates, private key correspondence to the public key, one or more outstanding or unsent messages, one or more message content, and any other suitable information. The encrypted local state may be retained locally on the client device. In some embodiments, the encryption component 210 encrypts the local state in a manner similar to or the same as described above with respect to operations 310 and 330. Upon encrypting and storing the local state, one or more components of the message encryption system 160 may erase the data represented by the encrypted local state from the client device. The remaining representation, the encrypted local state, may be retained. In some instances, the local state may also be stored in plaintext.

In operation 740, the communication component 230 transmits a member log to a key database. In some embodiments, the member log is a triple including a member identifier, a device identifier, and the symmetric key. The sender may recover the local state using the encrypted local state and the symmetric key associated with the member and the client device on the key database. In some embodiments, recovery of the local state is automatic, upon logging back into the client device. Components of the message encryption system 160 may also retrieve the local state by presenting a selectable user interface element to the sender upon log in, requesting the sender to select or deselect restoration of the local state.

In some embodiments, where the sender logs into a client device with an encrypted local state, the communication component 230 or the access component 220 retrieves the symmetric key. The encryption component 210 may decrypt the local state with the retrieved key. The local state may then be restored to a current state of the application or the client device. Where the sender is logging into the client device for the first time, the local state may not be restored. This may also preclude an unauthorized member from accessing the local state stored on the client device.

Embodiments of the present disclosure may enable secure end-to-end or account-to-account transmission of messages independent of computing devices at which a sender or receiver may currently be operating. The key database and other servers discussed in the present disclosure are not provided the content of messages transmitted between sender and specified recipient, as the message content is encrypted. The sender and receiver may move between or among devices and send or receive messages independent of which device is currently in use. Other members who may currently be operating a client device previously operated by the specified recipient do not receive the encrypted messages destined for the specified recipient. Further, the sender may move among devices and ensure the recipient receives the appropriate messages while precluding other members from accessing the messages at the client device in use by the sender. Embodiments of the present disclosure also enable use of parallel devices, for the sender or recipient, which employ partial encryption using window of time keys that, when erased, the content of messages may be effectively unrecoverable.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) is configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an Application Program Interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 8:
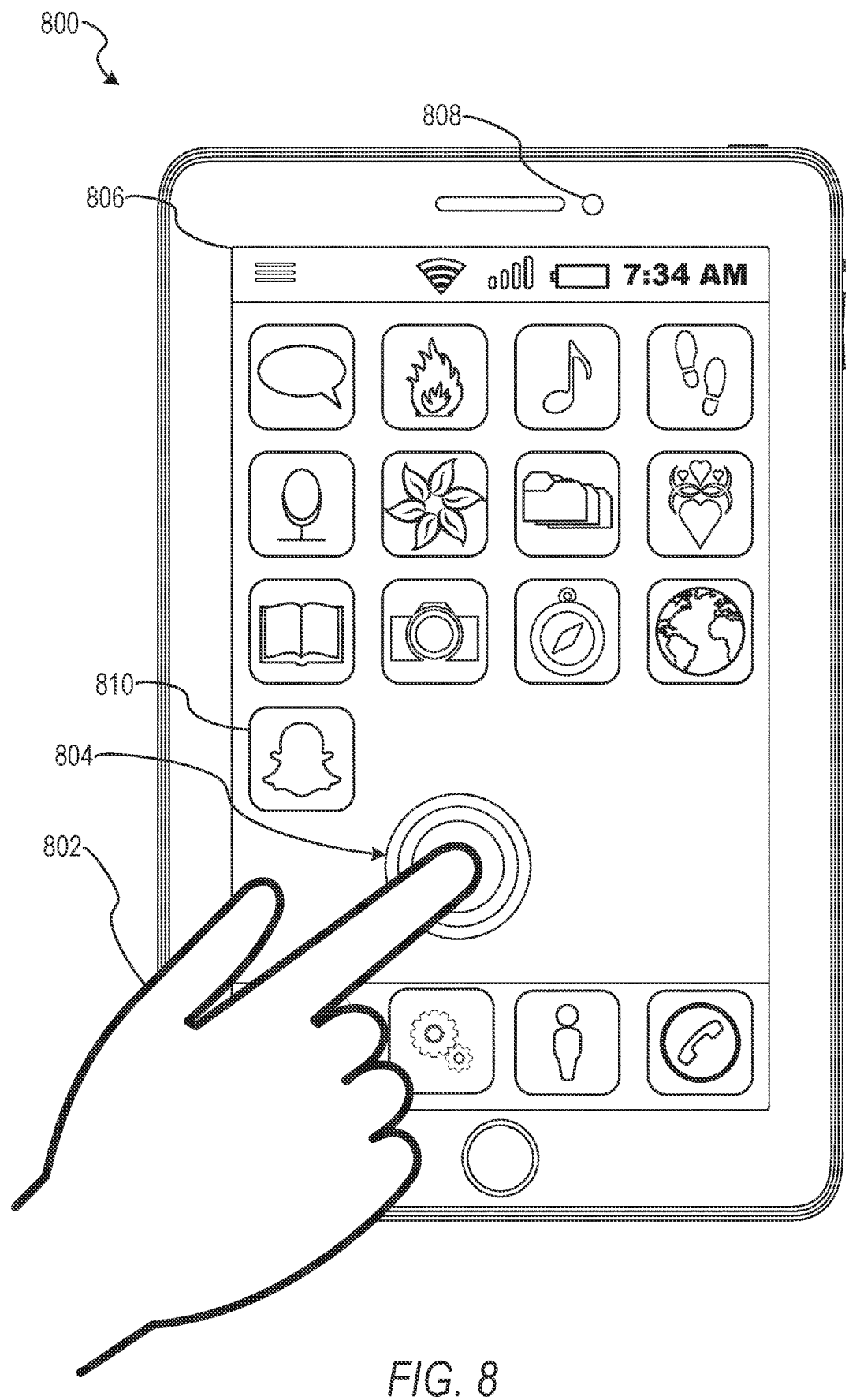
FIG. 8 is a user interface diagram depicting an example mobile device and mobile operating system interface, according to some example embodiments.

FIG. 8 illustrates an example mobile device 800 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 8, includes an imaging device 808. The imaging device 808 may be a camera or any other device coupled to the mobile device 800 capable of capturing a video stream or one or more successive images. The imaging device 808 may be triggered by the message encryption system 160 or a selectable user interface element to initiate capture of a video stream or succession of images and pass the video stream or succession of images to the message encryption system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments the social messaging application includes an ephemeral gallery of media created by users the social messaging application. These galleries may consist of videos or pictures posted by a user and made viewable by contacts (e.g., "friends") of the user. Alternatively, public galleries may be created by administrators of the social messaging application consisting of media from any users of the application (and accessible by all users). In yet another embodiment, the social messaging application may include a "magazine" feature which consists of articles and other content generated by publishers on the social messaging application's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the message encryption system 160 may perform device independent secure messaging within the ephemeral message, and securely transmit an encrypted version of the ephemeral message to another device, accessed by a specified recipient, using the ephemeral message system 130.

Software Architecture

Figure 9:
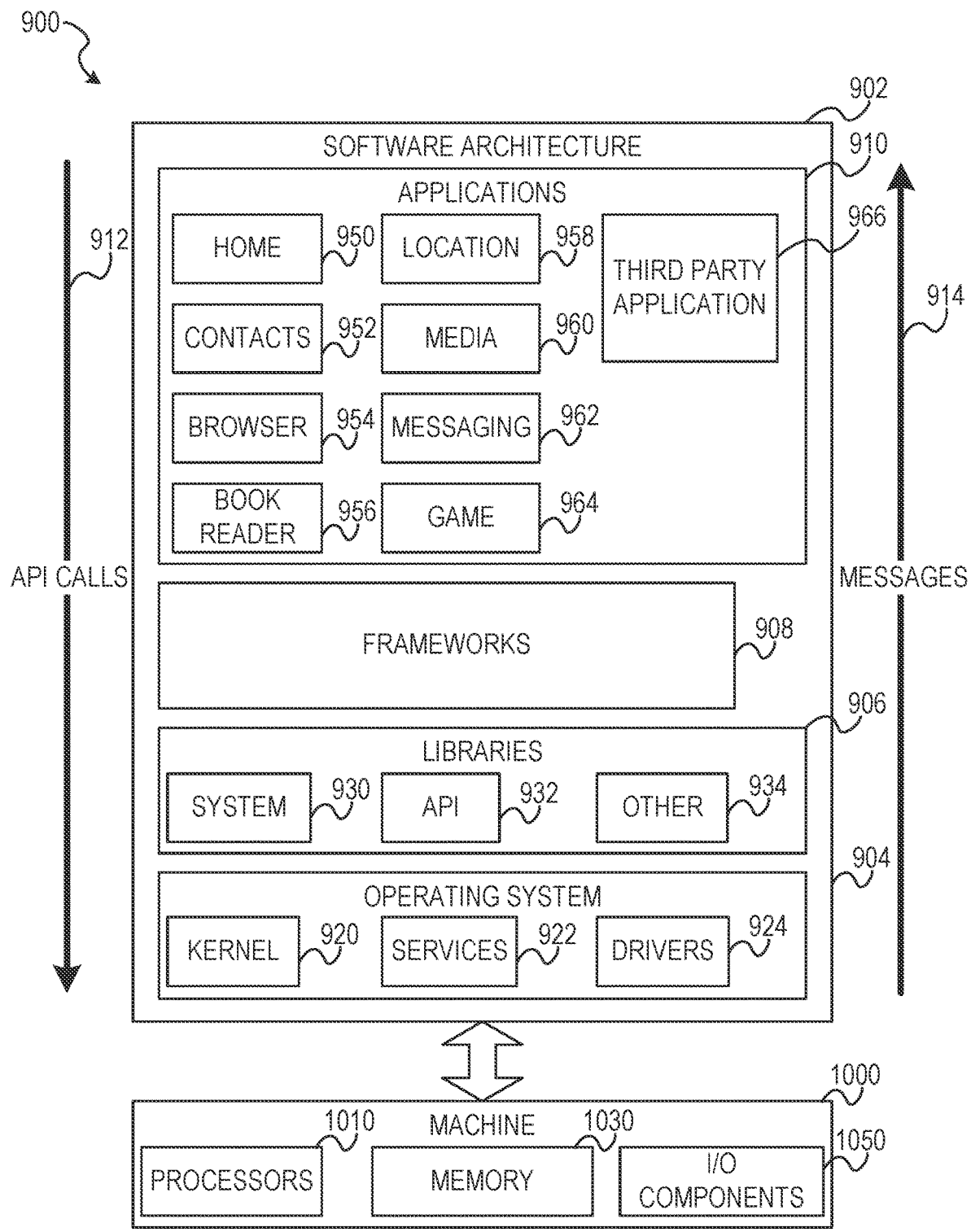
FIG. 9 is a block diagram illustrating an example of a software architecture that may be installed on a machine, according to some example embodiments.

FIG. 9 is a block diagram 900 illustrating an architecture of software 902, which can be installed on the devices described above. FIG. 9 is merely a non-limiting example of a software architecture, and it will be appreciated that many other architectures can be implemented to facilitate the functionality described herein. In various embodiments, the software 902 is implemented by hardware such as machine a 1000 of FIG. 10 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® PHONE, or another mobile operating system. In this example, the third-party application 966 can invoke the API calls 912 provided by the operating system 904 to facilitate functionality described herein.

Example Machine Architecture and Machine-Readable Medium

Figure 10:
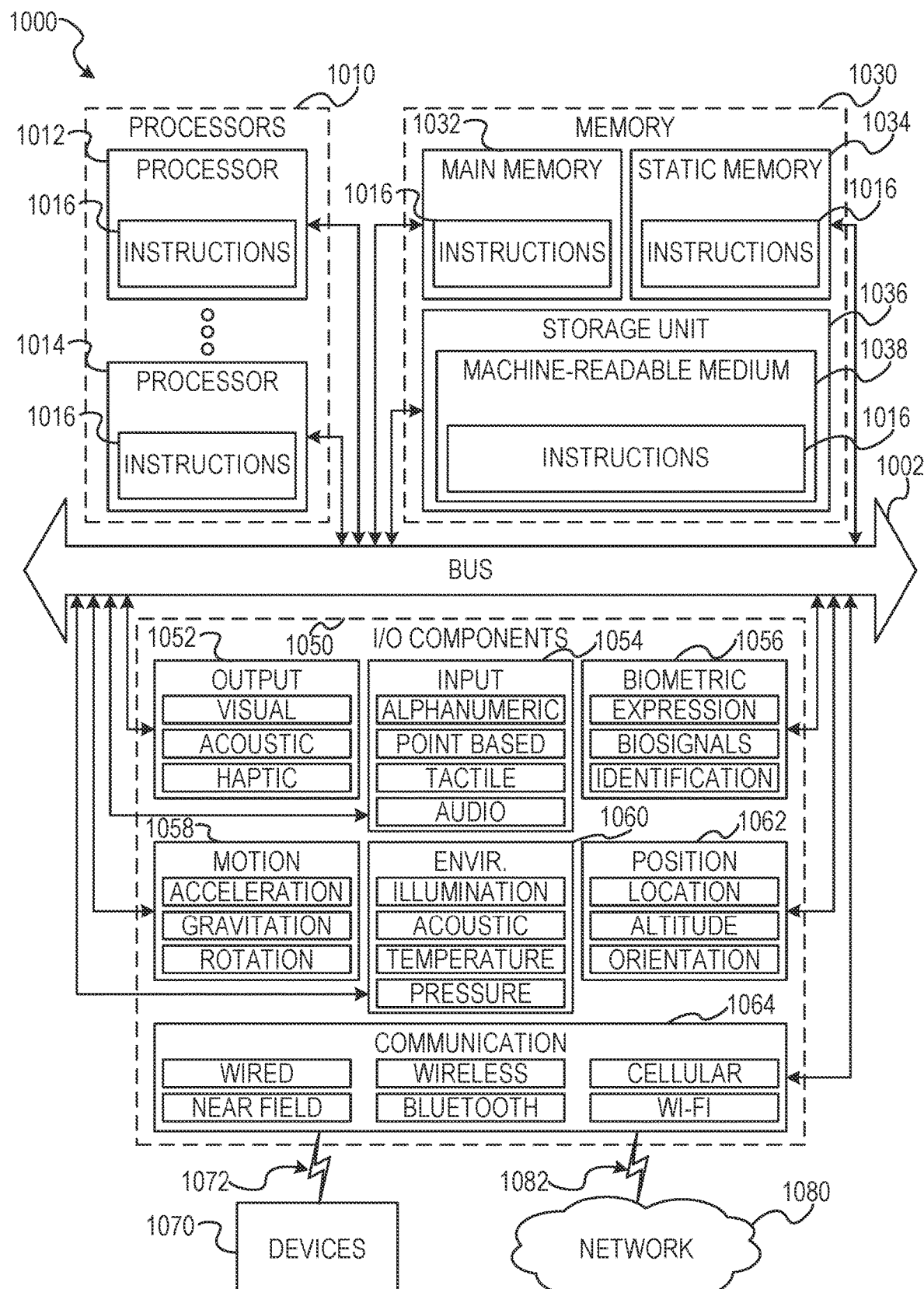
FIG. 10 is a block diagram presenting a diagrammatic representation of a machine in the form of a computer system within which a set of instructions may be executed for causing the machine to perform any of the methodologies discussed herein, according to an example embodiment.

FIG. 10 is a block diagram illustrating components of a machine 1000, according to some embodiments, able to read instructions (e.g., processor executable instructions) from a machine-readable medium (e.g., a non-transitory machine-readable storage medium) and perform any of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by processors of the machine 1000 (e.g., processors 1010), cause the machine 1000 to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLU-ETOOTH® or NFC beacon signal that may indicate a particular location, and so forth.

Transmission Medium

In various example embodiments, portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single CarrierRadio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:

encrypting, by one or more processors, message content of a message with an encryption key to generate an encrypted message, the encrypted message designated for a specified recipient;

selecting a set of recipient keys for the specified recipient from a plurality of member keys, each recipient key of the set of recipient keys associated with a distinct client device that is used by the specified recipient to access a social messaging system;

encrypting the encryption key for each recipient key of the set of recipient keys to generate a set of encrypted keys for the specified recipient;

transmitting, to each client device that is used by the specified recipient to access the social messaging system, the encrypted message and an encrypted key of the set of encrypted keys that is associated with the recipient key for that distinct client device that was used to encrypt the encrypted key;

detecting a session termination for a sending client device associated with a sender of the encrypted message, the session termination representing the sender logging out of the social messaging system or the sending client device;

based on the detecting the session termination, generating a symmetric key for the sending client device and the sender;

encrypting a local state of the sender on the sending client device with the symmetric key, the local state comprising at least two of: private and public keys stored on the sending client device, certificates, private key correspondence to the public key, one or more outstanding or unsent messages, or one or more message content; and transmitting a member log to a key database, the member log including a member identifier associated with the sender, a device identifier, and the symmetric key.

2. The method of claim 1, wherein the set of recipient keys are a set of public keys associated with the specified recipient.

3. The method of claim 1, wherein the set of recipient keys is limited to a predetermined number of recipient keys.

4. The method of claim 1, wherein the set of recipient keys is limited to a predetermined number of recipient keys corresponding to a most recent set of client devices used by the specified recipient.

5. The method of claim 1, where each recipient key of the plurality of member keys comprises a member identifier, a client device identifier, and a public key.

6. The method of claim 1, wherein the encryption key is a key pair including a private key and a public key and the message content is encrypted using the private key and encrypting the encryption key comprises encrypting the public key using the set of recipient keys to generate the set of encryption keys.

7. The method of claim 1, wherein the encrypted message is further designated for a second specified recipient and a recipient key associated with the second specified recipient has a value instead of an encryption key, the value indicating that the second specified recipient is a fake recipient.

8. The method of claim 1, wherein the set of recipient keys for the specified recipient is limited to a most recent set of client devices used by the specified recipient or wherein the set of recipient keys for the specified recipient is limited to a maximum predefined number of recipient keys.

9. The method of claim 1, further comprising:
determining that the specified recipient is not online; and
holding the encrypted message and the encrypted key for later delivery.

10. The method of claim 1, further comprising:
storing the encrypted local state on the sending client device; and
upon encrypting and storing the local state, erasing the data represented by the encrypted local state from the sending client device.

11. The method of claim 10, further comprising:
automatically restoring the local state, upon detecting the sender logging back into the sender client device, using the stored encrypted local state and the symmetric key generated for the sending client device and the sender.

12. The method of claim 1, further comprising:
receiving a new recipient key for a new client device not represented by a recipient key of the set of the recipient keys for the specified recipient;
encrypting the encryption key using the new recipient key to generate a new encrypted key for the specified recipient; and
transmitting the encrypted message and the new encrypted key to the new client device corresponding to the new recipient key.

13. The method of claim 12, wherein the new recipient key is received based on the specified recipient logging into the new client device.

14. A system, comprising:
one or more processors; and
a non-transitory processor-readable storage medium storing processor executable instructions that, when executed by the one or more processors, cause the one or more processors to perform operations comprising:
encrypting message content of a message with an encryption key to generate an encrypted message, the encrypted message designated for a specified recipient;
selecting a set of recipient keys for the specified recipient from a plurality of member keys, each recipient key of the set of recipient keys associated with a distinct client device that is used by the specified recipient to access a social messaging system;
encrypting the encryption key for each recipient key of the set of recipient keys to generate a set of encrypted keys for the specified recipient;
transmitting, to each client device that is used by the specified recipient to access the social messaging system, the encrypted message and an encrypted key of the set of encrypted keys that is associated with the recipient key for that distinct client device that was used to encrypt the encrypted key;
detecting a session termination for a sending client device associated with a sender of the encrypted message, the session termination representing the sender logging out of the social messaging system or the sending client device;
based on the detecting the session termination, generating a symmetric key for the sending client device and the sender;
encrypting a local state of the sender on the sending client device with the symmetric key, the local state comprising at least two of: private and public keys stored on the sending client device, certificates, private key correspondence to the public key, one or more outstanding or unsent messages, or one or more message content; and
transmitting a member log to a key database, the member log including a member identifier associated with the sender, a device identifier, and the symmetric key.

15. The system of claim 14, wherein the set of recipient keys is limited to a predetermined number of recipient keys.

16. The system of claim 14, wherein the set of recipient keys is limited to a predetermined number of recipient keys corresponding to a most recent set of client devices used by the specified recipient.

17. The system of claim 14, where each recipient key of the plurality of member keys comprises a member identifier, a client device identifier, and a public key.

18. The system of claim 14, wherein the encryption key is a key pair including a private key and a public key and the message content is encrypted using the private key and encrypting the encryption key comprises encrypting the public key using the set of recipient keys to generate the set of encryption keys.

19. The system of claim 14, wherein the encrypted message is further designated for a second specified recipient and a recipient key associated with the second specified recipient has a value instead of an encryption key, the value indicating that the second specified recipient is a fake recipient.

20. A non-transitory processor-readable storage medium storing processor executable instructions that, when executed by a processor of a machine, cause the machine to perform operations comprising:
 encrypting message content of a message with an encryption key to generate an encrypted message, the encrypted message designated for a specified recipient;
 selecting a set of recipient keys for the specified recipient from a plurality of member keys, each recipient key of the set of recipient keys associated with a distinct client device that is used by the specified recipient to access a social messaging system;
 encrypting the encryption key for each recipient key of the set of recipient keys to generate a set of encrypted keys for the specified recipient;
 transmitting, to each client device that is used by the specified recipient to access the social messaging system, the encrypted message and an encrypted key of the set of encrypted keys that is associated with the recipient key for that distinct client device that was used to encrypt the encrypted key;
 detecting a session termination for a sending client device associated with a sender of the encrypted message, the session termination representing the sender logging out of the social messaging system or the sending client device;
 based on the detecting the session termination, generating a symmetric key for the sending client device and the sender;
 encrypting a local state of the sender on the sending client device with the symmetric key, the local state comprising at least two of: private and public keys stored on the sending client device, certificates, private key correspondence to the public key, one or more outstanding or unsent messages, or one or more message content; and
 transmitting a member log to a key database, the member log including a member identifier associated with the sender, a device identifier, and the symmetric key.

\* \* \* \* \*